US008607304B2

(12) United States Patent
Hu et al.

(10) Patent No.: US 8,607,304 B2
(45) Date of Patent: Dec. 10, 2013

(54) SYSTEM AND METHOD FOR POLICY-ENABLED MOBILE SERVICE GATEWAY

(75) Inventors: Q James Hu, Sammamish, WA (US); Douglas Eng, Sammamish, WA (US); Terry Figurelle, Redmond, WA (US); Michael Britt, Everett, WA (US)

(73) Assignee: AT&T Mobility II LLC, Atlanta, GA (US)

(*) Notice: Subject to any disclaimer, the term of this patent is extended or adjusted under 35 U.S.C. 154(b) by 865 days.

(21) Appl. No.: 12/116,630

(22) Filed: May 7, 2008

(65) Prior Publication Data

US 2009/0228954 A1 Sep. 10, 2009

Related U.S. Application Data

(60) Provisional application No. 61/034,878, filed on Mar. 7, 2008.

(51) Int. Cl.
*G06F 21/00* (2013.01)

(52) U.S. Cl.
USPC ................ 726/1; 726/2; 726/3; 726/4; 726/5; 726/6; 726/25; 726/26; 726/27; 726/28; 726/29; 726/30; 709/227; 709/228; 709/229; 709/230

(58) Field of Classification Search
USPC ...................... 726/1–8, 25–30; 709/227–231
See application file for complete search history.

(56) References Cited

U.S. PATENT DOCUMENTS

| | | | | |
|---|---|---|---|---|
| 7,616,962 | B2 * | 11/2009 | Oswal et al. | 455/452.2 |
| 2003/0108015 | A1 * | 6/2003 | Li | 370/338 |
| 2004/0073928 | A1 * | 4/2004 | Alakoski et al. | 725/62 |
| 2006/0039364 | A1 * | 2/2006 | Wright | 370/352 |
| 2007/0066286 | A1 | 3/2007 | Hurtta | |
| 2008/0066148 | A1 * | 3/2008 | Lim | 726/1 |
| 2009/0100506 | A1 * | 4/2009 | Whang et al. | 726/4 |

FOREIGN PATENT DOCUMENTS

WO WO 2004/029854 A2 4/2004

OTHER PUBLICATIONS

International Search Report, PCT/US2009/036317, AT&T Mobility II LLC, Applicant, mailed May 28, 2010, 4 pages.

"3rd Generation Partnership Project; Technical Specification Group Services and System Aspects; Policy and charging control architecture (Release 8) v.8.0.0" 3rd Generation Partnership Project (3GPP); Technical Specification (TS). XX, XX, vol. 23.203, No. V8.0.0, Dec. 1, 2007, pp. 1-74, XP002575482, Chapter VI.

* cited by examiner

*Primary Examiner* — David Pearson
*Assistant Examiner* — Josnel Jeudy

(57) ABSTRACT

A policy-enabled service gateway contains a gateway function and a local policy engine containing policies related to the functionality of the associated gateway function. New or updated policies may be provided to the local policy engine from a centralized policy server. The policies within the local policy engine are functionally related to the gateway function and provide for policy and/or charging enforcement associated with the gateway function. If the local policy engine does not contain a particular policy, it may request the policy from the centralized policy server. The local policy engine may choose to store the requested policy for future use.

21 Claims, 4 Drawing Sheets

106b
SERVICE GATEWAY
122b
LOCAL POLICY ENGINE
124c
GATEWAY FUNCTION
144
146
140
104
POLICY SERVER
142
ACCESS GATEWAY
POLICY ENFORCEMENT ENGINE
102
112

SYSTEM AND METHOD FOR POLICY-ENABLED MOBILE SERVICE GATEWAY

BACKGROUND OF THE INVENTION

1. Field of the Invention

The present invention is directed generally to the control of data networks serving mobile wireless users. In particular, the present invention is directed to a system for policy management in a data network that uses policy rules to control service data flows at service gateways.

2. Description of the Related Art

Traditionally, service gateways perform specific functions where they are directly in the user plane traffic. For example, a Wireless Application Protocol (WAP) HTTP server processes WAP web traffic and translates between protocols. However, traditional service gateways have not been policy-enabled. Most of the management functions in the traditional gateways are scattered across the network and are done in localized and static fashion. Traditional service gateways do not have a policy function and are not able to communicate with the logically centralized policy management framework. Therefore, it can be appreciated that there is a significant need for a new type of policy management in edge gateways that will provide a dynamic policy framework. The present invention provides this, and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

As operators begin to deploy a policy management framework (PMF) to tackle network and service management challenges in the mobile data network, they find a need to build policy-enabled service gateways to leverage the PMF. Aside from their traditional functions (e.g., Wireless Application Protocol (WAP) web gateway, IM servers, location servers, etc.), service gateways can be policy-enabled so that the mobile operators can effectively control the behaviors of these gateways through polices. Architecturally, they become consumers and enforcers of policies.

Figure 1:
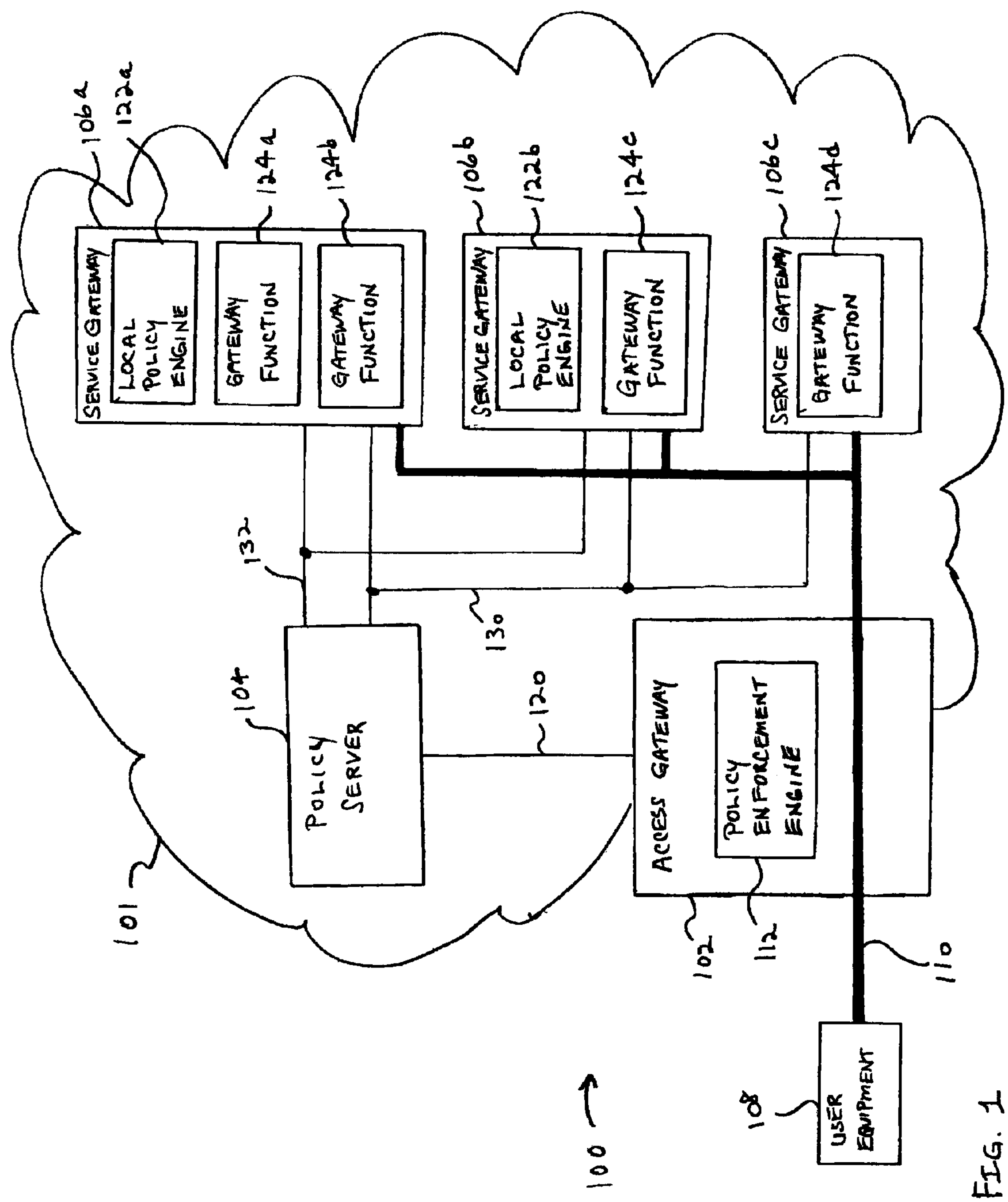
FIG. 1 shows a policy-based mobile service gateway architecture.

FIG. 1 illustrates a policy-enabled mobile service gateway architecture 100. This architecture 100 comprises a communication network 101 having an access gateway 102, a policy server 104, and one or more service gateways 106, including policy-enabled service gateways 106*a* and 106*b*. The architecture 100 is configured to provide packet-based services to subscribers on mobile user equipment 108. Examples of such services include transporting text messages to and from the user equipment 108 and delivering WAP web pages to the user equipment. Service data flows 110 pass between the service gateways 106 and mobile user equipment 108, passing through the access gateway 102.

The access gateway 102 has a policy enforcement engine 112 configured to control the service data flows 110 according to control policies. The policy enforcement engine 112 may be loaded with policy decision logic. A policy decision logic is a policy rule that is bound with identifying information for a specific service data flow 110 and identifying information of a specific subscriber (e.g., the subscriber operating the user equipment 108). The policy enforcement engine 112 is configured to examine each packet that flows through the access gateway 102, and look for information that matches service identifying information in one of the policy decisions. If a match is found, the policy enforcement engine 112 executes the associated policy rule. In some embodiments, the access Gateway 102 is a General Packer Radio Service (GPRS) implementation of a Gateway GPRS Support Node (GGSN) and the policy enforcement engine 112 is a policy control and charging enforcement function (PCEF) according to the 3GPP standards. The policy enforcement engine 112 operates within the access gateway 102 to control IP access to the public data network (e.g., communication network 101).

The policy server may serve as a centralized repository of policies used throughout the architecture 100 in an exemplary embodiment, the policy server may also provide policy in charging rules functionality. In one embodiment, the policy server 104 is a Policy and Charging Rules Function (PCRF) according to the 3GPP standards. The PCRF function includes policies relating to charges for particular subscribers and provided services.

The policy server 104 is logically linked to the access gateway 102 via a reference point 120. The reference point 120 serves as a signaling link. Between the access gateway 102 and the policy server 104. The policy server 104 is configured to receive, via reference point 120, information about service data flows 110 from the policy enforcement engine 112 and send policy information to the policy enforcement engine. In some embodiments, the policy information includes policy decisions. The policy server 104 may also provide charging data to the policy enforcement agency 112.

In an exemplary embodiment, the reference point 120 may conform with the 3GPP standard Rx and/or standard Gx reference points. As described above, the policy server 104 may provide operational policies to the policy enforcement engine 112 via the reference point 120 when implemented as, by way of example, the Gx reference point. In addition, the policy server 104 may provide charging policies to the policy enforcement engine 112 via, by way of example, a conventional Rx reference point. Alternatively, the reference point 120 may be implemented as enhanced Rx and/or Gx reference points. In yet another exemplary embodiment, the reference point 120 may conform with the DIAMETER protocol, but not comport with the 3GPP standard for the Gx reference point and/or Rx reference point. Thus, the architecture 100 is not limited by particular form of the communication protocol implemented by the reference 120.

A service gateway 106 can be a policy-enabled service gateway with an addition of a local policy engine 122. In the example of FIG. 1, service gateways 106*a* and 106*b* have local policy engines (122*a* and 122*b*, respectively), which makes these service gateways policy-enabled. In contrast, the service gateway 106*c* in FIG. 1 lacks a local policy engine, so it is not policy-enabled. A non-policy-enabled service gateway such as service gateway 106*c* may be included in the policy-based mobile service gateway architecture 100 along with policy enabled service gateways such as service gateways 106*a* and 106*b*, but is not required. Policy enforcement at the non-policy-enabled service gateway 106*c* is performed in a conventional manner. For example, policy enforcement for the non-policy-enabled service gateway 106*c* may be performed by the policy enforcement engine 112 in the access gateway 102.

The service gateways 106 each include one or more gateway functions 124. As will be described in greater detail below, the gateway functions 124 provide user services. In many instances, the services provided by the gateway functions 124 can be handled at the "edge" of the communication network 101. The architecture 100 advantageously shuttles service requests that can be handled at the edge of the communication network 101 to the gateway functions 124. This prevents service data flows 110 from continuing on within the communication network 101 and thus prevents unnecessary data flow within the communication network. Those skilled in the art will appreciate that this architecture 100 provides more efficient data throughput within the communication network 101.

Most service gateways 106 only include a single gateway function 116. For example, service gateway 106*b* includes a single gateway function 124*c*. This arrangement economically utilizes system resources. In the example of FIG. 1, local policy engine 122*b* is closely associated with the gateway function 124*c*. That is, the local policy engine 122*b* contains the policies that are required for satisfactory operation of that particular gateway function. The local policy engine 122*b* need not contain extraneous policies that are unrelated to the operation of the gateway function 124*c*. Thus, the tight interrelationship between the local policy engine and its associated gateway function (e.g., the local policy engine 122*b* and the gateway function 124*c*) serve to increase the efficiency of the policy-enabled service gateway (e.g., the service gateway 106*b*). Those skilled in the art will appreciate that this arrangement relieves some of the burden of centralized policy enforcement by tightly tying policy enforcement to the particular gateway function.

Alternatively, a single service gateway may contain more than one gateway function. In the example of FIG. 1, the service gateway 106*a* contains gateway functions 124*a* and 124*b*. The gateway functions 124*a* and 124*b* may be grouped together in a single service gateway because they provide related functions that have similarities in the policy enforcement. For example, the gateway function 124*a* may provide firewall function protection while the gateway function 124*b* may provide an edge router function. In this example, both gateway functions 124*a* and 124*b* provide security functionality. Thus, the local policy engine 122*a* may contain security policies that have commonality between the gateway function 124*a* and the gateway function 124*b*. In this example, it may be more efficient for overall operation of the communication network 101 to group these two gateway functions into a single service gateway having a single local policy engine. Those skilled in the art will appreciate that other gateway functions can be grouped into a single service gateway and utilize a single local policy engine when the policies have applicability to multiple gateway functions.

The gateway functions 124*a*, 124*b* and 124*c* in the policy-enabled service gateways 106*a* and 106*b* are configured to perform traditional gateway functions, but in a manner controlled by policies in the local policy engines 122*a* and 122*b* respectively. For example, gateway function 124*a* could be a location function that provides the geographical location of mobile user equipment 108. A policy in the local policy engine 122*a* controls the location gateway function 124*a*, determining who is allowed to see geographical location information for a particular user equipment 108.

In some embodiments, the local policy engine is configured to enforce charging policies as well as control policies. Charging policies refers to the process of billing customers for the provided services. Alternatively, the charging policies may be implemented by the policy server 104. As previously discussed, the policy server 104 may include functionality, such as PCRF implementation discussed in the 3GPP standard. The operation of charging policy servers is within the scope of knowledge of one of ordinary skill in the art and need not be described in greater detail herein.

The service gateways 106 are logically linked to the policy server 104 via reference point 130. The reference point 130 serves as a signaling link between the policy server 104 and the service gateways 106. The reference point 130 is used to communicate policies between the policy server 104 and the local policy engines 122. As discussed above, the policy server 104 may be configured to provide charging policies to the service gateways 106. This may include the non-policy-enabled service gateway 106*c* as well as the policy-enabled service gateways 106*a* and 106*b*.

In an exemplary embodiment, the reference point 130 may conform with the 3GPP standard Rx reference point. Alternatively, non-standard protocols and reference points may be used. For example, the reference point 130 may be configured as an enhanced Rx reference point. In yet another example embodiment, the reference point 130 may conform with the DIAMETER protocol, but not comport with the 3GPP standard for the Rx reference point. Thus, the architecture 100 is not limited by a particular form of the communication protocol used by the reference point 130.

Policy-enabled service gateways 106*a* and 106*b* have an additional reference point 132 to logically link with the policy server 104. Policy-enabled service gateways 106*a* and 106*b* are configured to send and receive policy information to and from the policy server 104 via the reference point 132. In an exemplary embodiment, the policy information includes policy decisions, which are policy rules bound with subscriber information and service information. In some embodiments, the policy server 104 is configured to bind service information and subscriber information to policy rules to make policy decisions which are then sent over reference point 132 to one or more of the policy-enabled service gateways 106*a* and 106*b*, to be enforced by the local policy engine 114*a* or 114*b*, respectively.

In the exemplary embodiment of FIG. 1, the non-policy-enabled service gateway 106 does not include the reference point 132. While the service gateway 106*c* includes the reference point 130 to exchange charging policies with the policy server 104, the policy enforcement functionality is not implemented in the non-policy-enabled service gateway 106*c*. Accordingly, there is no need for the reference point 132 between the policy server 104 and the service gateway 106*c*.

In other embodiments, the policy server 104 is configured to send policy rules, via the reference point 132, to one or more of the policy-enabled service gateways 106*a* and 106*b*, to be bound by the local policy engine 114*a* or 114*b*, respectively, with subscriber information and service information to form policy decisions which the local policy engine 114 then enforces. In an exemplary embodiment, the reference point 132 may conform with the 3GPP standard Gx reference point. In an alternative embodiment, the reference point 132 may be an enhanced Gx reference point. In yet other alternative embodiments, the reference point 132 may conform with the DIAMETER protocol, but not conform with the 3GPP Gx standards.

Service gateways 106 are configured to pass service related information to the policy server 104 via the reference point 132. In addition, policies may be updated centrally at the policy server 104 and relevant policies (i.e., policies related to the particular gateway function) may be routed to the respective local policy engines via the reference point 132. Thus, the local policy engines 122 may be updated as necessary from a centralized source, such as the policy server 104. In addition, there may be circumstances in which the policy-enabled service gateway 106 receives a user service request for which the local policy engine 122 does not have the appropriate policy. For example, a new user may be authorized to access a particular service, but the local policy engine 122 does not have updated information with respect to the new user. In such a situation, the policy-enabled service gateway 106 may request the relevant policy from the centralized policy server 104 via the reference point 132. The requested policy is transferred from the policy server 104 to the local policy engine 122 via the reference point 132.

Figure 2:
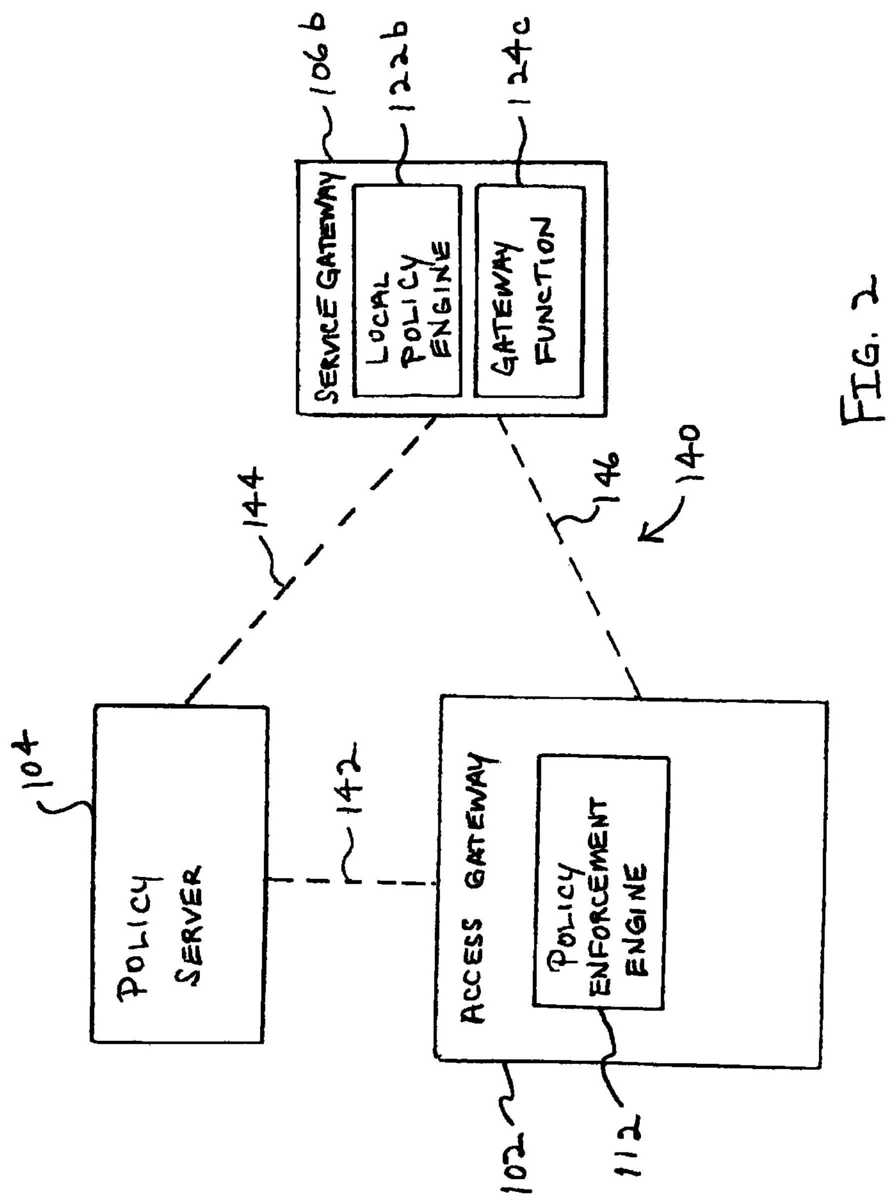
FIG. 2 is a simplified configuration of the gateway architecture of FIG. 1 illustrating a policy control loop.

Each local policy engine 114 is configured to form a signaling loop with the policy server 104 and the policy enforcement engine 110 to effect policy based dynamic service control. FIG. 2 is a simplified version of FIG. 1 illustrating a signal control loop 140 between the access gateway 102, the policy server 104, and the policy-enabled surface gateway 106*b*. For the sake of simplicity, the data service flow 110 (see FIG. 1) is not illustrated so that the signaling pathways provided by the control loop 140 may be more readily discerned. In the simplified diagram of FIG. 2, the signaling path 142 may be implemented as the reference point 120 (see FIG. 1). As previously discussed, this may include both policy enforcement functionality and policy charging functionality. That is, the policy server 104 may provide policy data to the policy enforcement engine 112 in the access gateway via the signaling path 142. In addition, the policy charging functionality of the policy server 104 may provide charging policies to the access gateway 102 via the signaling path 142.

In a similar fashion, the signaling path 142 between the policy server 104 and the policy-enabled gateway 106*b* may be implemented as the reference point 130 and/or the reference point 132 of FIG. 1. That is, the policy server 104 may provide policy data to the local policy engine 122*b* via the signaling path 144. As previously discussed, this may include updated policies and new policies. In addition, the charging functionality of the policy server 104 may provide charging policies to the policy-enabled service gateway 106*b* via the signaling path 144.

In addition, the signaling path 146 between the access gateway 102 and the policy-enabled gateway 106*b* enables communication there between. The architecture 100 is designed for dynamic policy enforcement. Thus, while policy enforcement may typically implemented by the local policy engine 122*b*, under some circumstances the policies may be enforced by the policy enforcement engine 112 in the access gateway 102. For example, load-balancing between the policy engines may be provided whereby some policies may be enforced by the policy enforcement engine 112 in order to achieve better load-balancing between the policy enforcement engine 112 and the access gateway 102 and the local policy engine 122*b* in the policy-enabled service gateway 106*b*. Policy enforcement information may be exchanged between the access gateway 102 and the policy-enabled service gateway 106*b* via the signaling path 146. Similarly, charging policies may be exchange the access gateway 102 and the policy-enabled service gateway 106*b* via the signaling path 146.

In an exemplary embodiment, the control loop 140 is policy driven and uses standard protocols to communicate service and network policy information. Policy-enabled service gateways 106*a* and 106*b* achieve dynamic policy enforcement in that enforcement points, such as policy enforcement engine 112, can concentrate on the task they are designed for, yet at the same time can request and enforce policies that affect services which must be carried together by other network elements, such as the local policy engine 122*b*. In addition, the local policy engine 122*b* can, at the same time, enforce and request policies that affect services which must be carried together by the policy enforcement engine 112.

The components described herein in some embodiments are implemented as a computer processor coupled to a memory, the memory containing instructions that when executed by the computer processor, perform the functions as described above. In other embodiments, the components are implemented as hard-wired circuits. The operational steps performed by the hardware circuitry (e.g., computer processor or hard-wired circuits) are described below.

Figure 3:
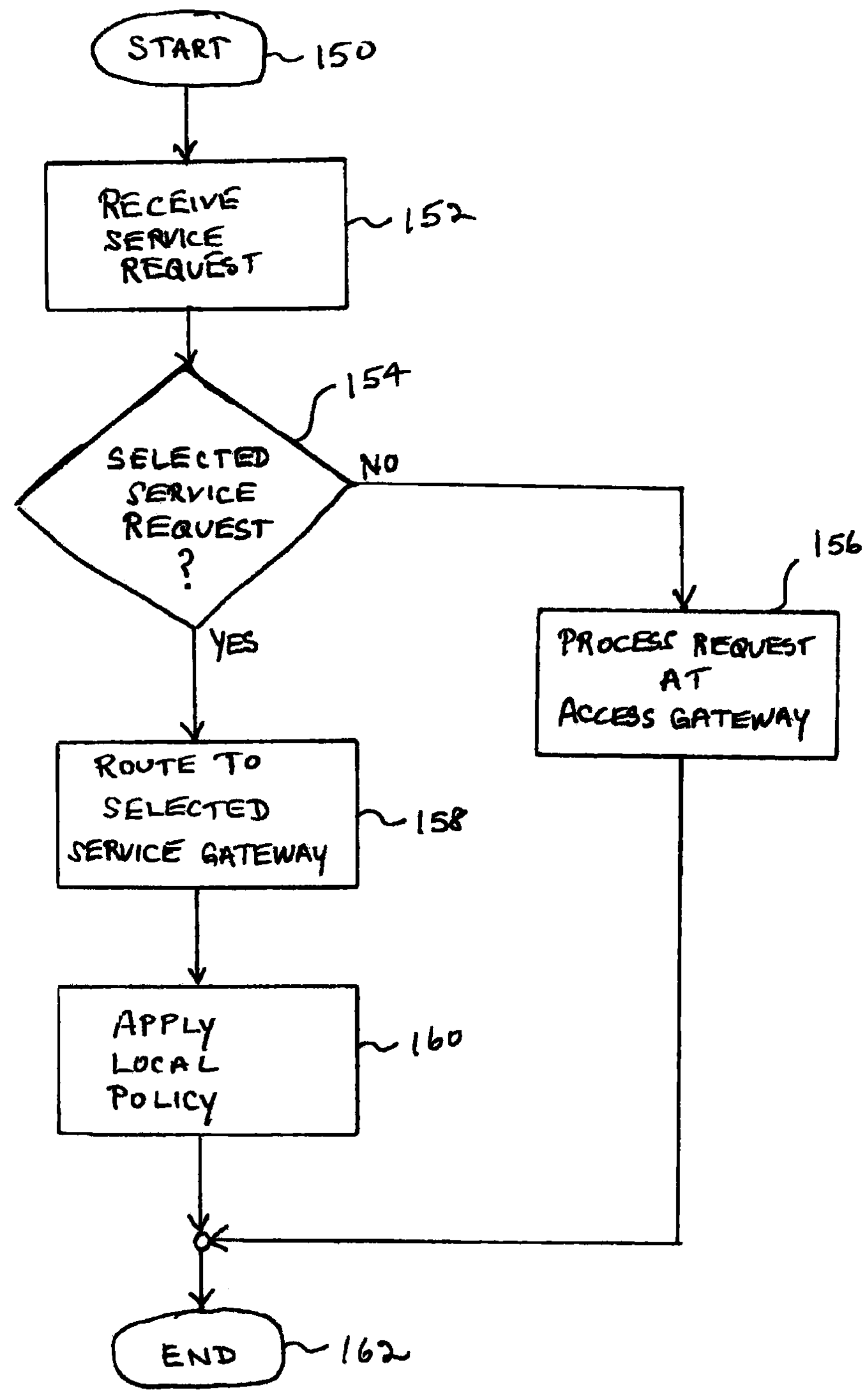
FIG. 3 is a flow chart illustrating the operation of the architecture of FIG. 1 to apply rules in a local policy engine.

The operation of the architecture 100 to route service requests to a policy-enabled service gateway is illustrated in the flow chart of FIG. 3. At a start 150 the network 101 is configured in a manner such as that illustrated in the exemplary embodiment of FIG. 1. At step 152, the access gateway (e.g., the access gateway 112 of FIG. 1) receives a service request. In decision 152, the access gateway 112 determines whether the incoming service request is a selected service request corresponding to one of the service gateways 106. If the selected service request does not correspond to one of the service gateways, the result of decision 154 is NO and, at step 156, the user service request is processed at the access gateway. Those skilled in the art will appreciate that the service data flow 110 may be routed through the access gateway to interior portions of the network for processing in a conventional manner. That form of processing is well-known in the art and need not be described in greater detail herein.

If the selected service request received at the access gateway corresponds to the service provided by one of the service gateways, the result of decision 154 is YES. In that event, in step 158, the service request is routed to the corresponding service gateway that provides the requested service. In the example embodiment of FIG. 1, the access gateway 112 will route the service request to service gateway 106. If the service gateway 106 is a policy-enabled service gateway, the service request will be routed to the service gateway 106*a* or 106*b*.

In step 160, the local policy engine 122 will apply the local policy to the service request and process it accordingly. The process ends at 162. As discussed above, application of policy rules by the local policy engine 122 advantageously offloads policy enforcement from a centralized policy enforcement engine (e.g., the policy enforcement engine 112 in FIG. 1) and allows the local policy engine to apply policies that are tightly related to the particular service provided by the policy-enabled service gateway. Alternatively, the architecture 100 may allow the centralized policy engine (e.g., the policy engine 112) to apply policies from a centralized location. This may be done based on the particular policies, or may be performed at a central location for purposes of load balancing throughout the network 101. Thus, the architecture 100 can dynamically alter the location at which the policy rules are stored and at which policy rules are applied to service data flows.

Figure 4:
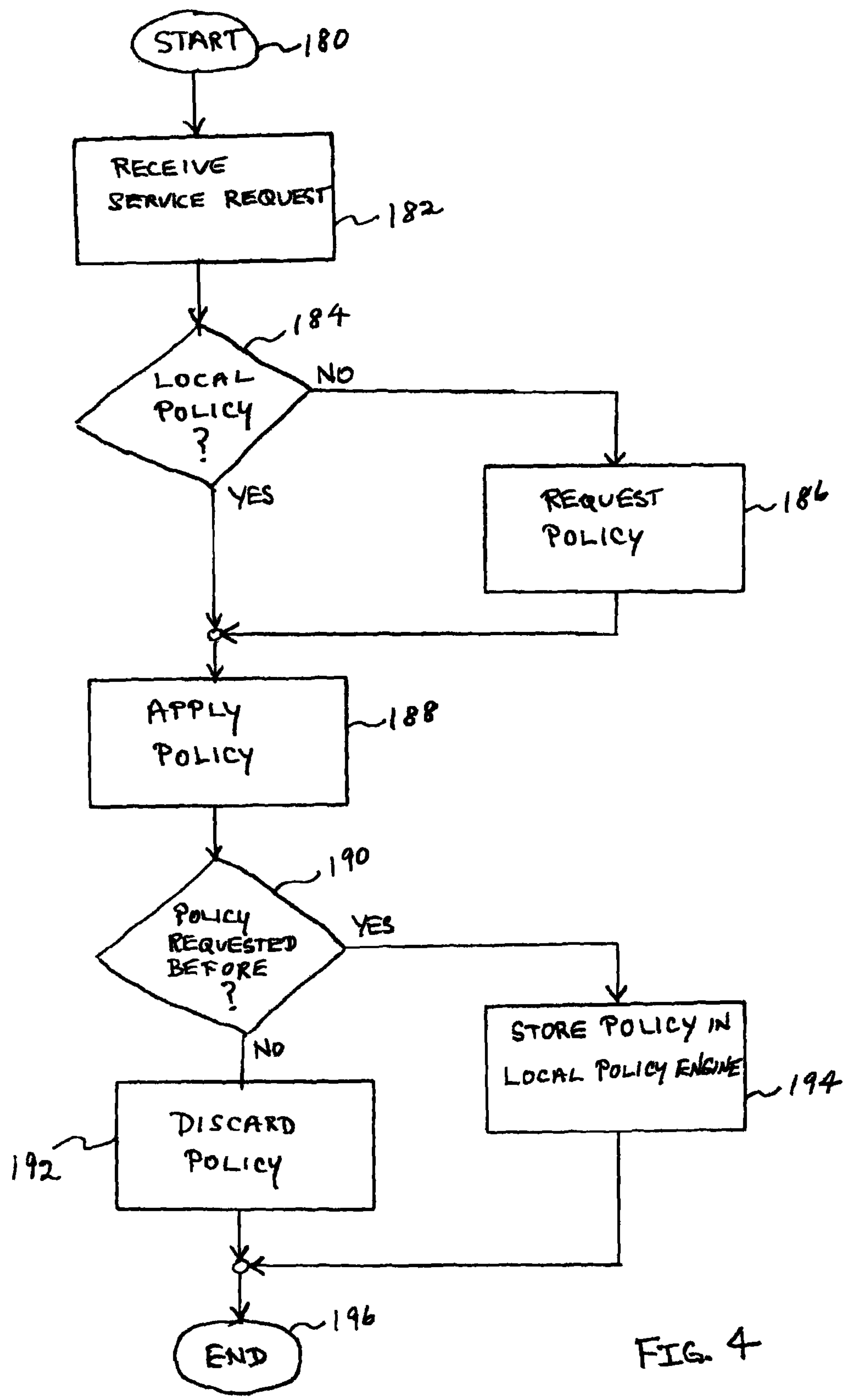
FIG. 4 is a flowchart illustrating the operation of the architecture of FIG. 1 to retrieve and/or store policies within a local policy engine.

As previously discussed, there may be circumstances under which the local policy engine 122 may not have the appropriate policy to apply to the service data flow. The operation of the architecture 100 to provide the necessary policy to the local policy engine is illustrated in the flow chart of FIG. 4. At a start 180, the user equipment (e.g., the user equipment 108 of FIG. 1) has made a service request. At step 182, a policy-enabled service gateway (e.g., the service gateway 106*a* or 106*b* of FIG. 1) receives the service request. In decision 184, the policy-enabled gateway determines whether the local policy engine (e.g., the local policy engine 122 of FIG. 1) contains the required local policy. If the local policy engine does not contain the required policy, the result of decision 184 is NO and, in step 186, the policy-enabled service gateway requests the policy. As previously discussed, the policy server 104 may provide the necessary policies in response to the request in step 186.

If the local policy engine (e.g., the local policy engine 122 of FIG. 1) already contains the local policy, the result of decision 184 is YES. In that event, or after the local policy engine receives the requested policy in step 186, the local policy engine may apply the policy in step 188. The application of policies to the service data flow 110 has already been described in detail above.

Those skilled in the art will appreciate control of policies within the local policy engine (e.g., the local policy engine 122 of FIG. 1) is desirable. Operational efficiency may be improved by proper storage, retention, and removal of policies from the local policy engine. That is, policies that are frequently used are stored within the local policy engine 122 for application to the related gateway function 124. However, policies that are infrequently used may not be stored within the policy engine 122. For example, a particular user request may be one-time unique request from a subscriber that may never be repeated again. When the local policy engine 122 requests the rule from the policy server 104, it may apply the rule and then make a determination whether or not to store the policy received from the policy server 104. Finally, the local policy engine may also function to remove policies that have not been utilized for some predetermined period of time.

Returning to FIG. 4, at decision 190, the policy-enabled service gateway (e.g., the service gateway 106*a* or 106*b* of FIG. 1) determines whether the policy requested in step 186 has ever been requested before. If the policy has never been requested before, the result of decision 190 is NO. In that event, the local policy engine 122 may discard the policy in step 192. Alternatively, if the policy has been requested before, the result of decision 190 is YES. In that event, the local policy engine 122 may store the policy in the local policy engine for future application. The process ends at 196.

Those skilled in the art will appreciate that a number of different selection criteria may be applied to determine whether or not to store a recently downloaded policy rule. For example, the local policy engine may store a rule if it has been requested a single time before, as illustrated in the flow chart of FIG. 3. Alternatively, the local policy engine may retain the downloaded policy only if it has been requested before within a pre-determined timeframe (e.g., within the last week). In yet another alternative, the local policy engine 122 may discard policies that have been saved, but have not been used within some pre-determined period of time (e.g., a month). Thus, it can be appreciated that the local policy engine can dynamically add or delete policies based on their frequency of use. Even if a policy has been deleted, it may be requested in the future, if necessary, from the policy server 104. The dynamic control of the local policy engine creates greater efficiency in policy management within the architecture 100.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A communication network comprising:

an access gateway for receiving user equipment traffic and to control user equipment access to the communication network;

a policy enforcement engine associated with the access gateway for enforcing a policy rule for the user equipment traffic;

a policy server that serves as a centralized repository of policies, wherein the policy server is communicatively coupled to the policy enforcement engine; and a service gateway having a first gateway function and a local policy engine, wherein the service gateway and the access gateway are different gateways and the policy enforcement engine and the local policy engine are different engines, wherein the first gateway function is communicatively coupled to the access gateway and for providing a selected service to a user equipment when the user equipment traffic includes a request for the selected service associated with the first gateway function and the local policy engine associated with the first gateway function enforces a policy rule associated with the selected service when the policy rule is stored in the local policy engine, wherein the service gateway is for permitting user equipment access to the first gateway function based on an enforcement of the policy rule associated with the selected service and enforced by the local policy engine, wherein the policy rule is received from the policy server if the policy rule is not stored in the local policy engine, and the policy rule is stored in the local policy engine if the policy rule has been requested before, wherein a plurality of policy rules is stored in the local policy engine that is related to services provided by the service gateway and does not contain extraneous policies that are unrelated to the services provided by the service gateway, wherein the service gateway has two logical links to the policy server, a first one of the two logical links for providing a charging policy to the service gateway and a second one of the two logical links for sending policy information to and from the policy server to the local policy engine.

2. The communication network of claim 1 wherein the policy server is for downloading policy rules to the policy enforcement engine.

3. The communication network of claim 1 wherein the policy server is for downloading policy rules, related to the selected service provided by the service gateway, to the local policy engine.

4. The communication network of claim 1, further comprising a second gateway function associated with the service gateway to permit user equipment access to a user equipment-requested service having an enforcement policy related to an enforcement policy associated with the first gateway function.

5. The communication network of claim 4 wherein the second gateway function associated with the service gateway is for permitting user equipment access to the user equipment-requested service provided by the second gateway function based on an enforcement of the policy rule associated with the selected service provided by the second gateway function and enforced by the local policy engine.

6. The communication network of claim 1 wherein the service gateway receives a user equipment request for a selected function and the local policy engine does not have an applicable rule for the user equipment service request, the local policy engine for sending a request for the applicable rule to a remote source of policy rules.

7. The communication network of claim 1 wherein the local policy engine discards the applicable rule from the remote source of policy rules after applying the applicable rule to the user equipment service request.

8. A communication network comprising:

an access gateway for receiving user equipment traffic and for controlling user equipment access to the communication network;

a policy enforcement engine associated with the access gateway for enforcing a policy rule for the user equipment traffic;

a policy server that serves as a centralized repository of policies, wherein the policy server is communicatively coupled to the policy enforcement engine; and a plurality of service gateways having a respective one of a plurality of gateway functions and a respective one of a plurality of local policy engines, wherein the plurality of service gateways and the access gateway are different gateways and the policy enforcement engine and the plurality of local policy engines are different engines, wherein the respective one of the plurality of gateway functions is communicatively coupled to the access gateway, each of the plurality of gateway functions for providing a selected service to a user equipment when the equipment traffic includes a request for the selected service associated with the respective one of the plurality of gateway functions when the policy rule is stored in the local policy engine and the respective one of the plurality of local policy engines associated with the respective one of the plurality of gateway functions enforces a policy rule associated with the selected service, wherein the plurality of service gateways is for permitting user equipment access to the respective one of the plurality of gateway functions based on an enforcement of the policy rule associated with the selected service and enforced by the respective one of the plurality of local policy engines, wherein the policy rule is received from the policy server if the policy rule is not stored in the respective one of the plurality of local policy engines, and the policy rule is stored in the respective one of the plurality of local policy engines if the policy rule has been requested before, wherein a plurality of policy rules is stored in the respective one of the plurality of local policy engines that is related to services provided by the respective one of the plurality of service gateways and does not contain extraneous policies that are unrelated to the services provided by the respective one of the plurality of service gateways, wherein each one of the plurality of service gateways has two logical links to the policy server, a first one of the two logical links for providing a charging policy to the service gateway and a second one of the two logical links for sending policy information to and from the policy server to the local policy engine.

9. The communication network of claim 8 wherein the policy server is for downloading policy rules to the policy enforcement engine.

10. The communication network of claim 8 wherein the policy server is for downloading policy rules, related to the selected service provided by ones of the plurality of service gateways, to respective ones of the plurality of local policy engines.

11. The communication network of claim 8, further comprising a second gateway function associated with a selected one of the plurality of service gateways to permit user equipment access to a user equipment-requested service having an enforcement policy related to an enforcement policy associated with the gateway function associated with the selected one of the plurality of service gateways.

12. The communication network of claim 11 wherein the second gateway function associated with the selected service gateway is for permitting user equipment access to the user equipment-requested service provided by the second gateway function based on an enforcement of the policy rule associated with the selected service provided by the second gateway function and enforced by the local policy engine.

13. The communication network of claim 8 wherein a selected one of the plurality of service gateways receives a user equipment request for a selected function and the local policy engine associated with the selected one of the plurality of service gateways does not have an applicable rule for the user equipment service request, the local policy engine selected one of the plurality of service gateways for sending a request for the applicable rule to a remote source of policy rules.

14. The communication network of claim 8 wherein the local policy engine associated with the selected one of the plurality of service gateways discards the applicable rule from the remote source of policy rules after applying the applicable rule to the user equipment service request.

15. A method for operating a communication network comprising:

receiving a service request in user equipment traffic from a user equipment in the communication network at an access gateway;

determining which one of a plurality of service gateways the service request corresponds to, wherein each one of the plurality of service gateways comprises a first gateway function and a local policy engine, wherein each one of the plurality of service gateways has two logical links to the policy server, a first one of the two logical links for providing a charging policy to the service gateway and a second one of the two logical links for sending policy information to and from a policy server to the local policy engine, wherein a plurality of policy rules is stored in each local policy engine of a respective one of the plurality of service gateways that is related to services provided by the respective one of the plurality of service gateways and does not contain extraneous policies that are unrelated to the services provided by the respective one of the plurality of service gateways;

forwarding the service request to a selected one of the plurality of service gateways;

determining if a policy rule associated with the service request is stored in the local policy engine of the selected one of the plurality of service gateways, and if the policy rule is not stored in the local policy engine, requesting the policy rule from the policy server;

when the policy rule is stored in the local policy engine, providing a selected service to the user equipment at the service gateway via the first gateway function in accordance with the policy rule;

enforcing the policy rule using the local policy engine associated with the first gateway function at the selected gateway of the plurality of service gateways;

controlling user equipment interaction with the first gateway function for the requested selected service based on enforcement of the policy rule associated with the selected service and enforced by the local policy engine at the selected gateway of the plurality of service gateways;

discarding the policy rule if the service request is the one-time request; and storing the policy rule in the local policy engine if the service request has been requested before.

16. The method of claim 15 wherein the local policy engine associated with the first gateway function contains policies associated with the selected service.

17. The method of claim 15, further comprising downloading a policy rule to the access gateway from a centralized source of policy rules to permit enforcing the policy rule for the user equipment traffic at the access gateway.

18. The method of claim 15, further comprising downloading a policy rule to the local policy engine from a centralized source of policy rules to permit enforcing the policy rule by the local policy engine associated with the first gateway function.

19. The method of claim 15, further comprising providing a selected service to a user equipment at a second gateway function when the user equipment traffic includes a request for the selected service associated with the second gateway function.

20. The method of claim 19 wherein controlling user equipment interaction with the second gateway function for the requested selected service is based on an enforcement of the policy rule associated with the selected service and enforced by the local policy engine.

21. The method of claim 19 wherein controlling user equipment interaction with the second gateway function for the requested selected service is based on an enforcement of the policy rule associated with the selected service and enforced by a local policy engine associated with the second gateway function and different from the local policy engine associated with the first gateway function.

* * * * *